United States Patent [19]

Horiuchi et al.

[11] 4,417,340
[45] Nov. 22, 1983

[54] METHOD FOR PRODUCING DISCHARGE IN GAS LASER AT LOW VOLTAGE

[75] Inventors: Naoya Horiuchi, Kawasaki; Takafumi Ohhara, Tokyo; Reiji Sano, Kawasaki, all of Japan

[73] Assignee: Matsushita Electric Industrial Company, Limited, Osaka, Japan

[21] Appl. No.: 251,968

[22] Filed: Apr. 3, 1981

[30] Foreign Application Priority Data

Apr. 4, 1980 [JP] Japan .................................. 55-44884

[51] Int. Cl.³ .............................................. H01S 3/22
[52] U.S. Cl. ....................................... 372/58; 372/59; 372/60; 372/81; 372/33
[58] Field of Search ...................... 372/58, 59, 60, 81, 372/83, 91, 89, 76, 33

[56] References Cited

U.S. PATENT DOCUMENTS

| 3,605,038 | 9/1971 | Byrne et al. | 372/58 |
| 3,745,482 | 6/1973 | Patel | 372/58 |
| 3,882,414 | 5/1975 | Jeffers et al. | 372/81 |

*Primary Examiner*—James W. Davie
*Assistant Examiner*—Léon Scott, Jr.
*Attorney, Agent, or Firm*—Lowe, King, Price & Becker

[57] ABSTRACT

In a gas laser in which a mixture of gases is excited under the influence of an electric field, a first constituent gas of the mixture is introduced into a laser tube to allow a discharge to occur in the introduced gas at predetermined partial pressure. A second constituent gas of the mixture is then introduced into the laser tube until the combined gases reach the normally operating pressure of the mixture to allow a discharge to occur in the later introduced gas.

8 Claims, 5 Drawing Figures

METHOD FOR PRODUCING DISCHARGE IN GAS LASER AT LOW VOLTAGE

BACKGROUND OF THE INVENTION

The present invention relates to a gas laser system in which laser oscillation is excited by discharges in a mixture of gases, and in particular to a method for discharging the mixture at a low voltage and a laser system embodying the method. The invention is particularly useful for $CO_2$ lasers.

In conventional $CO_2$ gas lasers, a mixture of $CO_2$, $N_2$ and He gases is introduced to a laser tube at respective partial pressures to allow a discharge to occur in the active gas under the influence of a DC potential. When high power laser output is desired for conventional gas lasers, the discharge electrodes must be spaced a substantial distance from each other. The lengthening of the discharge distance inevitably results in an increase in the d.c. potential applied to the electrodes. This in turn increases the element of danger as well as in the cost of the equipment. Reducing the d.c. potential while meeting the high laser output requirement thus represents a contradictory, but essential factor in rendering the gas laser system available commercially for extensive applications.

SUMMARY OF THE INVENTION

The primary object of the invention is therefore to provide a method for producing a discharge in a mixture of gases at a low voltage by introducing the constituent gases in sequence rather than simultaneously.

According to the invention, a method for producing a discharge in a mixture of gases in a laser tube under the influence of an electric field, comprises the steps of introducing a first constituent gas of the mixture into the laser tube until it reaches a predetermined partial pressure to cause a discharge to occur in said first constituent gas, and introducing a second constituent gas of the mixture into the laser tube to combine with the first constituent gas until the combined mixture reaches a normally operating pressure to cause a discharge to occur in the second constituent gas.

The invention also provides a gas laser system which comprises a laser tube having a pair of electrodes connected in use to a voltage source to generate an electric field thereacross, a first gas supply source connected to the laser tube to supply it with a first constituent gas of a mixture at a predetermined partial pressure, a second gas supply source connected by flow regulating means to the laser tube to supply it with a second constituent gas of the mixture, and means for detecting when a discharge occurs in the first constituent gas under the influence of the electric field and controlling the flow regulating means to introduce the second gas to the laser tube so that the mixture therein reaches a normally operating pressure.

Preferably, the first constituent gas allows its partial pressure in the combined mixture to account for a greater proportion of the total pressure, and in that constituent gas the discharge occurs at a potential lower than the potential at which a discharge occurs in the second constituent gas. In a $CO_2$ laser in which a mixture of $CO_2$, $N_2$ and He gases is excited, the He gas is first introduced to the laser tube as the first constituent gas, and one of $CO_2$ and $N_2$ or a mixture thereof is introduced as the second constituent gas. If one of $CO_2$ and $N_2$ is used as the second constituent gas, the other of these gases is mixed with the He gas and used as the first constituent gas.

BRIEF DESCRIPTION OF THE DRAWINGS

The invention will be further described with reference to the accompanying drawings, in which.

DETAILED DESCRIPTION

Figure 1:
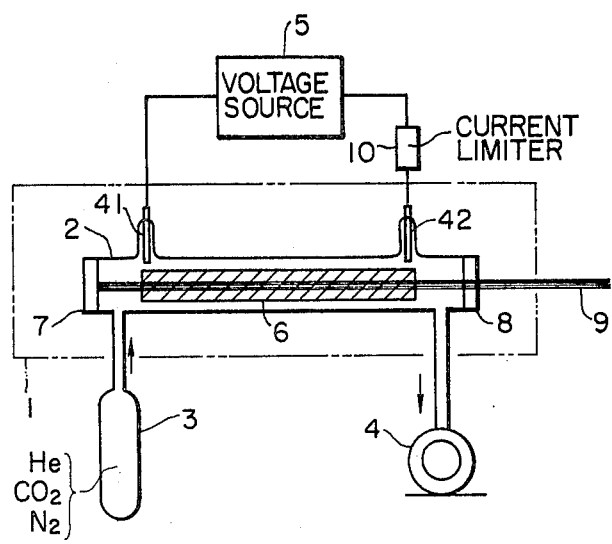
FIG. 1 is an illustration of a prior art $CO_2$ laser.

Prior to description of the embodiment of the present invention reference is first had to FIG. 1 in which a conventional $CO_2$ gas laser is schematically illustrated as a typical example. A broken-line rectangle 1 is a resonator housing in which a laser resonator 2 of glass or ceramic tube is provided. A source 3 of pressurized gases supplies a mixture of $CO_2$, $N_2$ and He in a ratio of 1:2:10 to the tube 2. The introduced gases are exhausted by an exhaust pump 4 such that the pressure inside the tube 2 is maintained constant at all times. The resonator 2 is provided with electrodes 41 and 42 which are connected to a voltage source 5 through a current limiting circuit 10 to cause the gases to discharge in a region 6. Inversion of gas population occurs in the area 6, as is well known in the art, which serves to sustain laser oscillation. A reflecting mirror 7 and an output mirror 8 are positioned at the opposite ends of the laser tube in the conventional manner to allow the excited energy to oscillate between them for delivery of an output laser beam 9.

Figure 2:
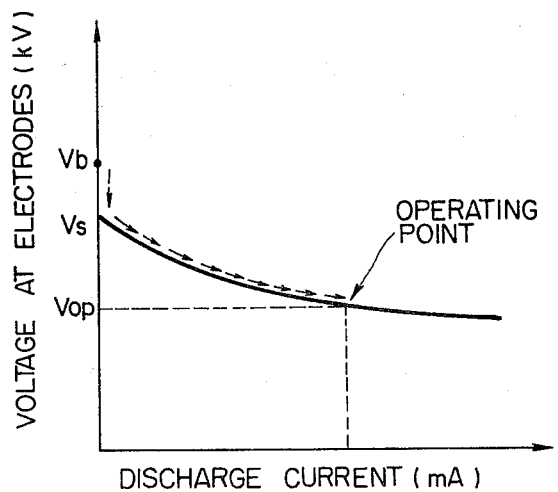
FIG. 2 is a graphic illustration of a voltage curve of the prior art $CO_2$ laser plotted as a function of discharge current.

FIG. 2 is a graphic illustration of the operating characteristic of the laser system of FIG. 1 in which the voltage required to sustain laser oscillation is plotted as a function of discharge current. The source voltage Vb is obviously much higher than the starting voltage Vs at which discharge takes place. The voltage impressed upon the electrodes 41 and 42 drops instantly from source voltage Vb when a discharge occurs and then gradually decreases until it reaches the normal operating voltage Vop.

With the tube 2 having a typical length of about 1 meter and the gas pressure inside the tube which maximizes the laser output being approximately 40 Torr, the operating voltage Vop is approximately 7 kV and the starting voltage Vs is in a range from 13 kV to 14 kV. This requires that the source voltage Vb be higher than 14 kV, a value higher than twice the operating voltage. For a tube having more than a 2-meter length, the starting voltage exceeds 28 kV. Therefore, a greatest care must be exercised in handling the laser system.

Figure 3:
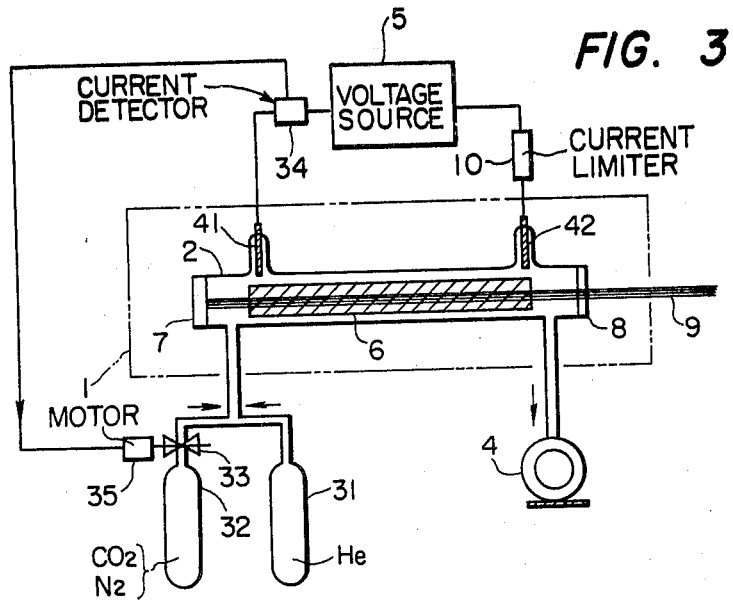
FIG. 3 is an illustration of a $CO_2$ laser according to the invention.

FIG. 3 is an illustration of the embodiment of the present invention in which parts corresponding to those in FIG. 1 are marked with the same numerals as those in FIG. 1. A $CO_2$ gas laser system of the invention is characterized by the inclusion of at least two gas supply sources 31 and 32 which are connected together to the resonator tube 2. The gas supply source 32 contains $N_2$ or $CO_2$ gas, or a mixture thereof and the source 31 contains He gas, or a mixture of He with one of $N_2$ and $CO_2$. A control valve 33 is provided in the passage between the source 32 and the tube 2. Further included is a current sensor 34 which detects when discharge occurs in the tube 2 and generates a signal for impression on an electric motor 35 which in turn controls the valve 33.

Figure 4:
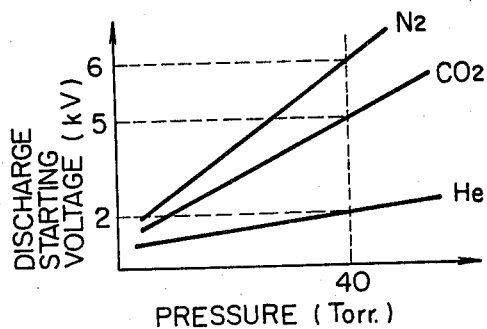
FIG. 4 is a graphic illustration of voltages at which discharge occurs in each of the constituent gases of the $CO_2$ laser plotted as a function of individual pressures.

According to experiments it was found that the constituent gases $CO_2$, $N_2$ and He which are to be combined in a mixture in the laser tube 2 possess different discharging characteristics as, illustrated in FIG. 4, when each of the constituent gases is separately allowed to discharge at a given pressure in an evacuated chamber. For example, at a pressure of 40 Torr, the $N_2$, $CO_2$, and He gases are separately discharged at voltages of about 6 kV, 5 kV and 2 kV, respectively. It is seen from FIG. 4 that the $N_2$ and $CO_2$ gases are dischargeable at lower voltages than the above-mentioned values if their pressures are lowered below the 40 Torr. In a $CO_2$ gas laser the He gas accounts for a substantial part of the total pressure of the gas mixture. This suggests that the introduction of He into the laser tube 2 prior to the introduction of the remaining gases will result in a lowering of starting voltages for the laser introduced gases.

The operation of the laser system of FIG. 3 is based on this principle. The He gas is first introduced to the gas tube 2 from the source 31 at a pressure which is approximately the value of steady state partial pressure inside the tube. The He gas is then discharged at a voltage typically 2 kV when its pressure inside the tube 2 reaches a 77% value of the total. The current sensor 34 generates a motor control signal to energize the motor 35 to open the valve 33 to introduce the $CO_2$ and $N_2$ gases to the tube 2 so that their partial pressures inside the tube gradually increase until the total pressure value of about 40 Torr is reached. The subsequently introduced gases are discharged at a voltage of 4 kV to 5 kV which are considerably lower than the starting voltages of the conventional laser system. The presence of relatively high pressure Hellium gas in the discharge state is a primary factor that contributes to the lowering of starting voltages for the later introduced gases.

Figure 5:
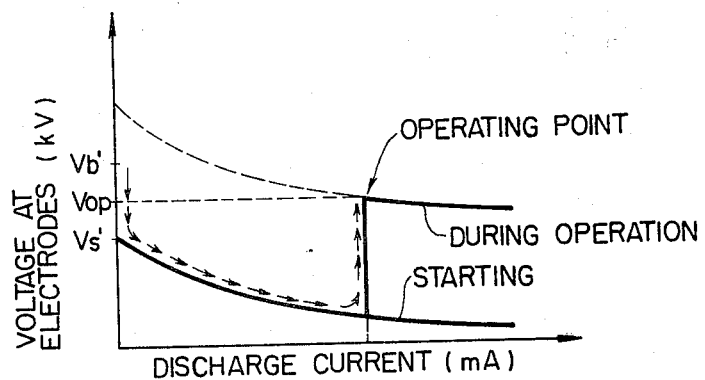
FIG. 5 is a graphic illustration of a voltage curve of the $CO_2$ laser of FIG. 3 plotted as a function of discharge current.

As graphically illustrated in FIG. 5, the starting voltage Vs' of the gas laser of the invention is lower than the operating voltage Vop of the system and the voltage source 5 is only required to have a voltage Vb' which is approximately 20% higher than the operating voltage of 7 kV. The voltage applied to the electrodes 41 and 42 varies as indicated by dotted-line arrows from the time the $CO_2$ and $N_2$ gases are introduced to the time the laser system is ready to start operating.

The reduction of the starting voltage allows a design which eliminates the rigorous insulation requirements and which results in a low cost, less dangerous gas laser system.

The invention further provides an additional advantage in that the time it takes to reach the required gas pressure prior to operation is reduced to less than $\frac{1}{3}$ the time it takes when the mixed gases are introduced in the conventional manner.

What is claimed is:

1. A method for ionizing a mixture of first and second constituent gases in a laser tube under the influence of an electric field, comprising the steps of:
   introducing the first constituent gas having a first ionization voltage into said tube until a predetermined partial pressure is reached to cause said first constituent gas to ionize under the influence of said field;
   detecting an occurrence of ionization of the first constituent gas in the laser tube, and, in response;
   introducing the second constituent gas having a second ionization voltage higher than the first ionization voltage into said tube until a normal operating pressure of the mixture is reached to allow the second constituent gas to ionize.

2. A method as claimed in claim 1, wherein the partial pressure of said first constituent gas is higher than the partial pressure of said second constituent gas.

3. A method as claimed in claim 1 or 2, wherein said mixture of gases comprises $CO_2$, $N_2$ and He, and wherein said first constituent gas is He or a mixture of He and $N_2$ and said second constituent gas is $CO_2$, $N_2$ or a mixture thereof.

4. A method as claimed in claim 1 or 2, wherein the step of introducing said second constituent gas comprises the steps of:
   detecting a current generated as a result of said discharge in said first constituent gas; and
   gradually introducing said second constituent gas into said tube in response to the detection of said current.

5. A gas laser system comprising:
   a laser tube having a pair of electrodes connectable to a voltage source to generate an electric field thereacross;
   a first gas supply source containing a first constituent gas of a mixture having a first ionization voltage;
   a second gas supply source containing a second constituent gas of the mixture having a second ionization voltage higher than the first ionization voltage;
   means for detecting an occurrence of ionization in said laser tube; and
   means for introducing the first gas from the first source into said laser tube until a predetermined partial pressure is reached to cause the first gas to ionize under the influence of the electric field and thereafter in response to said detecting means introducing into the laser tube the second gas from the second source until a normal operating pressure of the mixture is reached.

6. A gas laser system as claimed in claim 5, wherein said detecting means comprises a current detector connected in a circuit between said voltage source and one of said electrodes for detecting a current generated as a result of the ionization of said first gas in said laser tube.

7. A gas laser system as claimed in claim 5 or 6, wherein the partial pressure of said first constituent gas is higher than the partial pressure of said second constituent gas.

8. A gas laser system as claimed in claim 5, wherein said first constituent gas comprises He and said second constituent gas comprises one of $CO_2$ and $N_2$ or a mixture thereof.

* * * * *